(12) United States Patent
Rosenbaum et al.

(10) Patent No.: US 6,256,109 B1
(45) Date of Patent: Jul. 3, 2001

(54) IMAGE ENLARGEMENT SYSTEM

(76) Inventors: Richard Rosenbaum, 2618 Coloniel Way, Bloomfield Hills, MI (US) 48304; Stephen Aulie, 103 Fieldcrest St. #303, Ann Arbor, MI (US) 48103

( * ) Notice: Subject to any disclaimer, the term of this patent is extended or adjusted under 35 U.S.C. 154(b) by 0 days.

(21) Appl. No.: 08/862,479

(22) Filed: May 23, 1997

Related U.S. Application Data

(60) Provisional application No. 60/018,571, filed on May 29, 1996.

(51) Int. Cl.$^7$ ................................................. G06K 15/00
(52) U.S. Cl. ............................................. 358/1.2; 358/1.1
(58) Field of Search ..................................... 395/102, 109, 395/117, 101; 428/48; 358/448, 528, 451, 446, 450, 453, 1.1, 1.2, 1.9, 1.18, 1.448; 382/298, 284; 394/86; 399/86

(56) References Cited

U.S. PATENT DOCUMENTS

| | | | |
|---|---|---|---|
| 4,400,419 | * | 8/1983 | Laczynski ............................ 428/41.3 |
| 4,748,758 | * | 6/1988 | Gaston .................................... 40/359 |
| 4,765,654 | * | 8/1988 | Nakamura ............................. 283/67 |
| 4,853,752 | * | 8/1989 | Takahashi et al. ..................... 355/77 |
| 4,897,943 | * | 2/1990 | Otake ..................................... 40/768 |
| 4,897,944 | | 2/1990 | Otake ..................................... 40/159 |
| 4,900,597 | * | 2/1990 | Kurtin ................................ 428/40.2 |
| 4,958,237 | * | 9/1990 | Kubota ................................. 358/451 |
| 5,146,343 | * | 9/1992 | Fujii ..................................... 358/296 |
| 5,200,242 | * | 4/1993 | Hohmann ........................... 428/40.1 |
| 5,278,400 | * | 1/1994 | Appel ................................... 235/494 |
| 5,571,587 | * | 11/1996 | Bishop et al. .......................... 428/43 |
| 5,631,747 | * | 5/1997 | Farrell et al. ......................... 358/448 |
| 5,666,471 | * | 9/1997 | Fujii ..................................... 395/117 |
| 5,702,789 | * | 12/1997 | Fernandez-Kirchberger et al. ... 428/40.1 |
| 5,789,050 | * | 8/1998 | Kang .................................. 428/42.3 |

* cited by examiner

Primary Examiner—Arthur G. Evans
(74) Attorney, Agent, or Firm—Gifford, Krass, Groh, Sprinkle, Anderson & Citkowski, PC

(57) ABSTRACT

Methods and articles of manufacture facilitate the partitioning of an image into a plurality of discrete sections for reassembly into an enlarged version thereof. The image to be enlarged is received in an electronic form and displayed on a display device such as that associated with a personal computer. User commands are input relating to the way in which the image is to be partitioned, including the number of discrete sections. Each section is then printed under user control, enabling the printed sections to be assembled into the enlarged version. The electronic representation of the image may be received through digitally capturing or importation from a file, a clipboard, or any other appropriate source. The image may be in black-and-white or in color, and may be produced photographically or by any other graphical or electronic process. Grid lines may be displayed along with the electronic representation of the image, and the lines or the image may be moved relative to one another prior to printing, which may take place onto a novel sheet material which may be a label or a microperforated sheet having an outer, peripheral edge and a rectangular score line spaces apart from the edge so that no unprinted gaps appear between the assembled sheets.

12 Claims, 11 Drawing Sheets

Richard Rosenbaum

- This document can easily be enlarged to 2x2, 3x3, or 4x4 pages of regular 81/2"x11" stock
- Import or create the document in a variety of ways
- Very easy to use

*For use in any situation!*

Work or Play

Richard R

- This document can easily be enlarged to 2x2, 3x3, or 4x4 pages of regular 8 1/2"x11" stock
- Import or create the document in a variety of ways

Fig – 2B (con't)

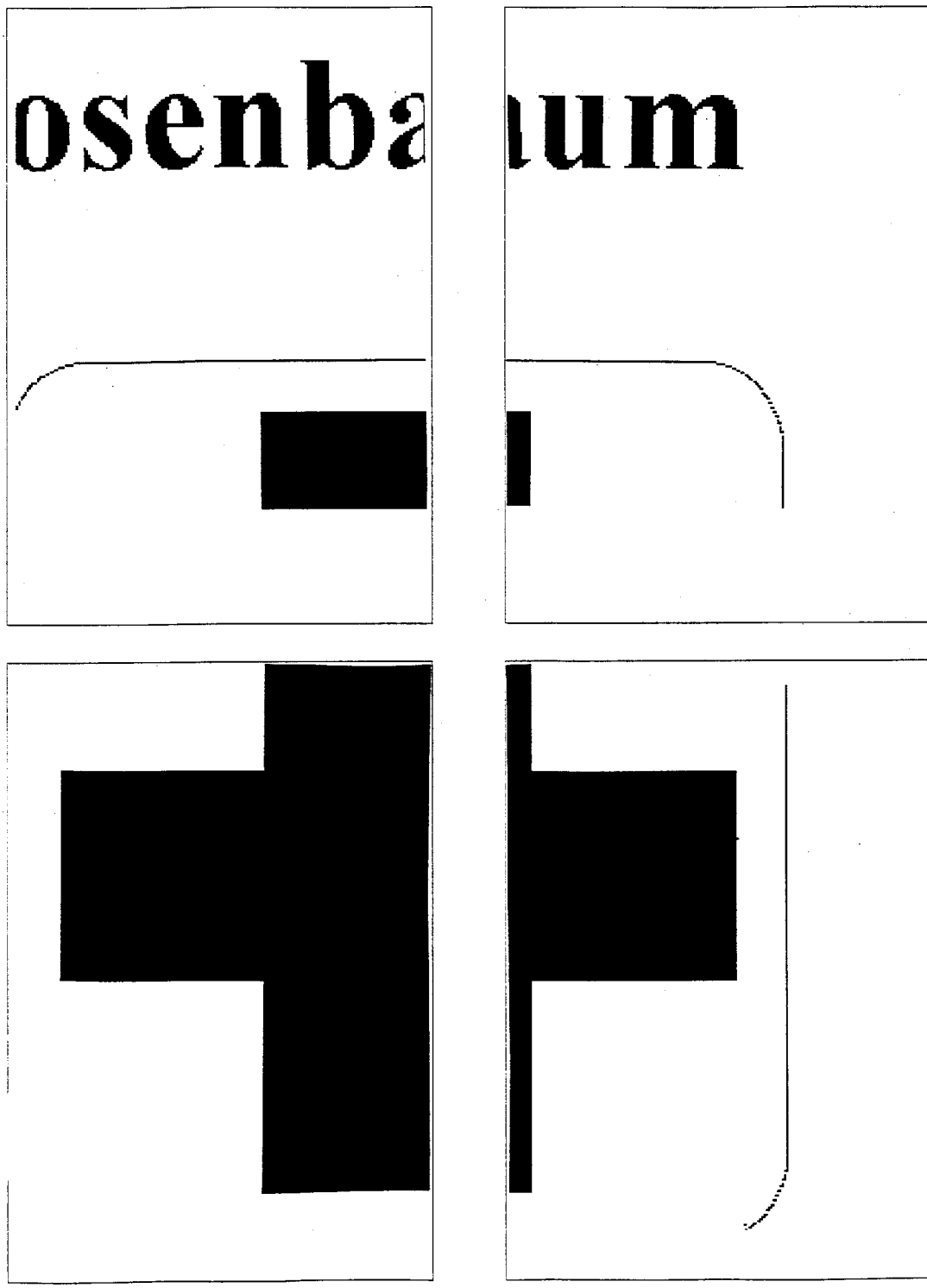
Fig – 2B (con't)

For use in an

Work of

Fig – 2B (con't)

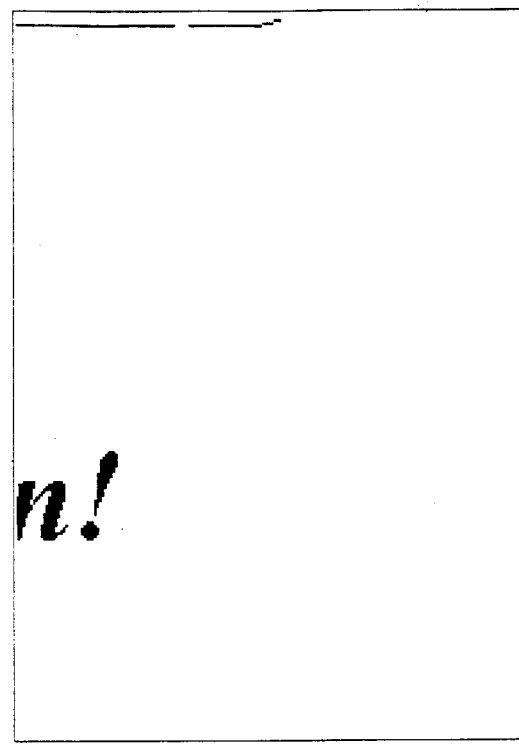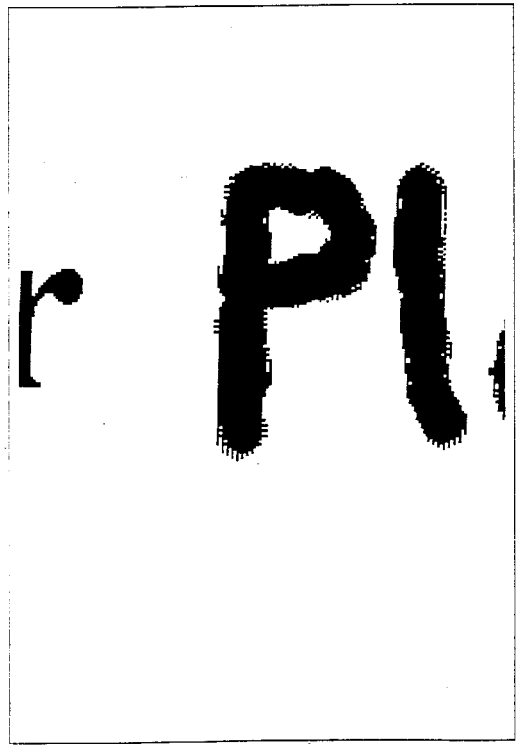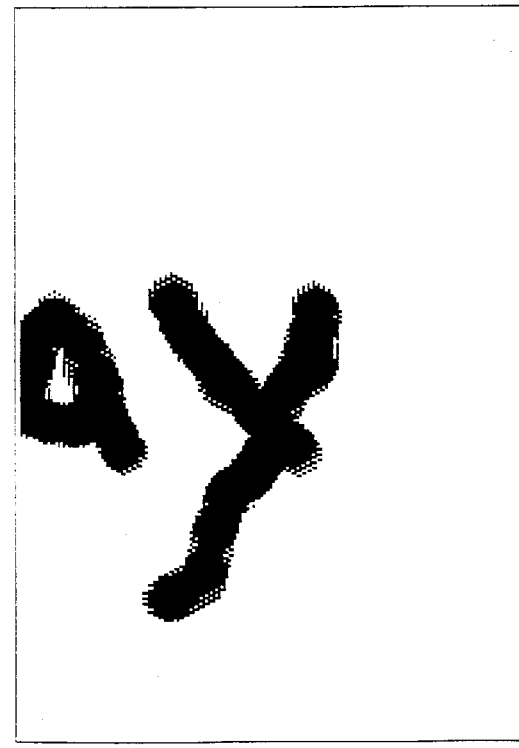
Fig – 2B (con't)

IMAGE ENLARGEMENT SYSTEM

REFERENCE TO RELATED APPLICATION

This application claims priority of U.S. provisional application Ser. No. 60/018,571, filed May 29, 1996, the entire contents of which are incorporated herein by reference.

FIELD OF THE INVENTION

This invention relates generally to the scaling of a printed image and, in particular, to methods enabling a personal-computer user to create images or to import them from various sources and print enlargements of those images over a variable, user-determined number of conventional or pre-scored sheets.

BACKGROUND OF THE INVENTION

It is often desirable, if not necessary, to create enlarged images containing textual and/or graphical information. Enlarged images of this kind have a number of potential uses, including announcements, teaching aids, as well as presentations, both professional and non-professional. Unfortunately, the existing mechanisms capable of providing suitable enlargements, particularly of graphical or non-textual images, are either very expensive, limited in applicability, or both.

One solution to this problem involves the use of photographic techniques, whereby multiple pictures, each representing a portion of the image to be enlarged, may be assembled, for example, on a backboard of some kind. Such an approach is at least implied in U.S. Pat. Nos. 4,897,943 and 4,897,944 to Otake and Otake et al, respectively. This approach is not only expensive, due to the fact that photographic enlargements are costly, but time-consuming, both in terms of the photo finishing involved and the integration and assembly of the various images onto a suitable support structure. Additionally, it is often difficult to control color and contrast from photograph to photograph, resulting in an unsuitable, visually apparent demarcation between the final, assembled enlargement.

Although some software programs and modules do exist which are capable of performing an enlargement function, their utility is significantly limited in scope. Most, for example, allow only enlarged displays of text from a banner or text file, for use at parties, and so forth, and cannot accommodate graphical images. Nor do such programs allow for certain conveniences, such as variable segmentation, print preview, and other utilities essential to a workable human interface. None involve printing on pre-scored output labels or other media in order to avoid the need to cut away or otherwise remove unwanted borders that surround printed images. The need remains, therefore, for an enlargement system capable of importing images from a variety of sources while allowing a great deal of user interaction and possibilities respecting final segmentation and assembly.

SUMMARY OF THE INVENTION

The present invention is directed toward methods and articles of manufacture which facilitate the partitioning of an image into a plurality of discrete sections for reassembly into an enlarged version of the image. According to a method aspect, an image to be enlarged is received in an electronic form and displayed on a display device such as that associated with a personal computer. Further computer-resident programming provided by the invention interprets commands from a user relating to the way in which the image is to be partitioned, including the number of discrete sections. Each section is then printed under user control, enabling the printed sections to be assembled into the enlarged version of the image.

The electronic representation of the image may be received through the step of scanning or digitally capturing the image, including importation from a file, a computer clipboard, or any other acceptable source. The image may be in black-and-white or in color, and may be produced photographically or by any other graphical or electronic process. The aspect ratio of the image may be user-determined or, alternatively, inventive routines may be used to analyze the format of the electronic representation of the image so as to automatically select either a portrait or landscape orientation.

In addition to the electronic representation of the image, the method and apparatus may be used to display a plurality of grid lines representative of the way in which the image is to be partitioned. In accordance with a user control, the grid lines may then be moved in relation to the electronic representation of the image on the display device or the electronic representation itself may be moved in relation to the grid lines.

Various printing options are also available, including the ability to print, onto each section, one or more registration marks useful in assembling the sections into the enlarged version of the image. A novel sheet may also be provided according to the invention, having an outer, peripheral edge and a rectangular score line spaced apart from the edge defining a border around the sheet. This arrangement allows printing devices unable to print directly up to an edge to print instead immediately up to the score line, enabling the border to be detached therefrom and the sheets assembled with their borders removed with no unprinted gaps between the assembled sheets. Printing may also occur onto an adhesive-backed sheet, with or without the score lines, after which the sheets may be mounted onto a supporting substrate upon the removal of a release layer from the back of each sheet.

As yet a further printing option, the system may print onto at least one of the discrete sections, inconspicuous visual indicia representative of an identification code. For example, a minute pattern may be used. to provide a binary-coded serial number.

Standard PC systems with a printer are sufficient to use the system, but systems with high screen resolutions, and high-quality printers and scanners would be able to more fully exploit the capabilities of this powerful, yet easy-to-use system.

BRIEF DESCRIPTION OF THE DRAWINGS

FIG. 2B, which is 16 pages long, represents the subunits comprising the image of FIG. 2A, having been printed in sectional fashion;

DETAILED DESCRIPTION OF THE PREFERRED EMBODIMENT

Figure 1:
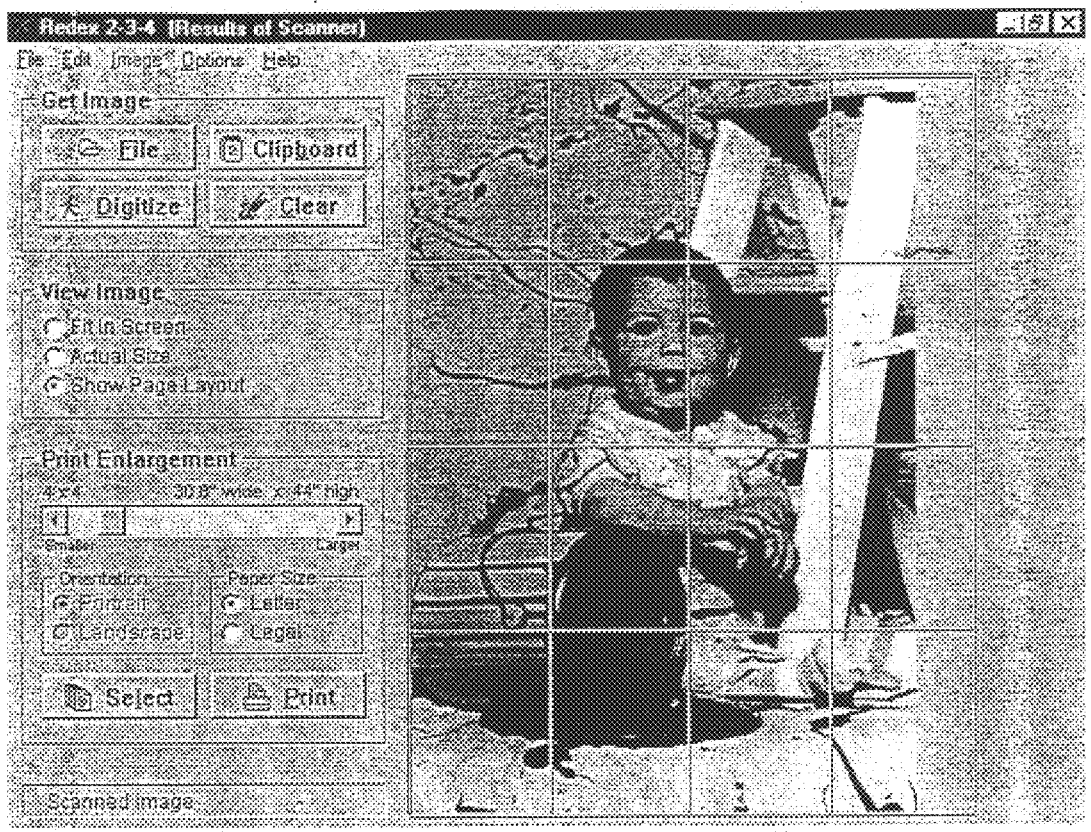
FIG. 1 illustrates a screen shot of a user interface according to the invention.

The present invention resides in a method enabling a user to create or import images from various sources and print enlargements of these images over a variable, user-determined number of paper sheets. The images, which may take any form, including photographs, printed documents, and so forth, may be imported by the user from various sources, including a scanner, digital camera, a file, a computer clipboard, etc. The image may be viewed in one of several ways, including at its largest possible screen size while maintaining its correct proportions, with or without a "page grid" superimposed over it, or at its actual size and proportions within the screen confines using scroll-bars, for example.

The image to enlarge can be shown on the screen with a page grid superimposed over it, which may represent one to many pages. The image is preferably displayed in its correct proportions, with the page grid correctly proportioned and the image correctly proportioned to the page grid. By means of a slide control, the user is able to determine the dimensions (in pages) of the page grid superimposed over the image. Thus, if the page grid divides the image into four sections, the enlargement would span four printed pages. The page grid depicts precisely how the image will be distributed over the selected number of pages. The largest possible image will preferably be printed, in correct proportion, to the page or pages of landscape/portrait orientation and paper size. This occurs, regardless of whether the image is wider than it is tall, taller than it is wide, or square.

In a preferred embodiment, the image always utilizes the maximum amount of paper, from left to right and from top to bottom. Thus, it is common for the right-most pages to have unused canvas area to the right or for bottommost pages to have unused canvas area to the bottom. Since the program provides the user with a visual representation of the print layout via the page grid, it is easy to see these unused page areas. If desired, the user may alternatively specify that the printed image be centered on the pages, so the unused page areas will serve as a border around the image. Since unused page area will normally be only to the right or to the bottom, an additional border will be imposed on the fully-utilized dimension. If image proportions necessitate some columns or rows of the page grid to be completely without any image, those pages will optionally be ignored and not run needlessly through the printer.

A user can reprint a page or any range of pages for any reason, such as when one or more pages emerge creased, wrinkled, or otherwise unsuitable for use. This is also useful for previewing any portion of the enlargement.

Optionally, the user may elect the program to number the component pages of an enlargement using a grid format. As an example, 4:3 could mean row 4, column 3. The numbers, which may be coded in binary or another fashion, would be fairly inconspicuous and would be very valuable for enlargements consisting of many pages which might become shuffled out of sequence.

Inconspicuous printing of a licensee serial number may also be encoded on an enlargement according to the invention. For example, a row of properly spaced pixels may be printed (some on, some off) with the endpoint pixels serving as a scale as well as beginning and ending points, indicating the serial number's binary or reverse-binary representation. This number, which may appear in an area that the program deems least conspicuous, is printed for identification purposes and to discourage software piracy.

The binary printout of the serial number (represented by pixels being printed or not printed) will, if necessary, be printed on an area grayed out (or whited out or even blackened out depending on image circumstances). Ideally, the code is printed on a white area, in which it appears as specks so minute that they are usually dismissed as being printer toner residue.

Specially scored sheets, which may include an adhesive backing and/or microperforations, may be made available according to the invention to simplify the assembly of an enlargement. These sheets are preferably scored to approximate the smallest maximum print width and height of popular printers on the market. A setup routine within the program allows the user to calibrate the program with respect to an attached printer to print precisely within the confines of the scored perimeter, enabling the scored adhesive sheets to be universally usable by any printer on the market. Since the image is printed up to and including the edges of the inside scored portion of the special sheets, the user may simply remove a label from the smooth backing of an adhesive sheet or remove the borders from a microperforated sheet and place it on a poster board, wall, or any other surface, aligning this label or partial sheet with others in row/column fashion.

FIG. 1 is a screen shot of a user interface according to the invention. Generally speaking, user commands are input on the left side of the figure, with the right side showing a divisionalized image as selected for printing. In particular, in a preferred embodiment, the left portion of the image of FIG. 1 includes an upper portion entitled "Get Image," where the user may choose from file, clipboard or scanner-type inputs or, alternatively, may clear a previous entry. In the middle section on the left side entitled "View Image," the user may select enlargement or reduction modes, and choose between a screen fit or actual size. In the lower lefthand portion of the screen display, entitled "Print Enlargement," the user may select from a variety of options including portrait mode, landscape mode, and paper at letter or legal size. In addition, using a scroll bar, image size may be selected from the smallest proportions (to the leftmost extent of the scroll bar), to the largest proportions (the rightmost section of the scroll bar).

In FIG. 1, the right-hand portion of the screen display not only includes a picture of a young child, but has also been divided up into nine sections which will print out on separate sheets. Note that the three rightmost sheets do not fill the entire sheet but, nevertheless, each will print with a right-hand vertical blank bar to ensure that, when the nine pieces are fitted together as shown on the screen display, the correct aspect ratio of the original image will be maintained. Alternately, the unused areas of the rightmost and/or the bottom sheets may be removed prior to printing or, alternately, the image may be centered vertically and horizontally within the available white space to create a proportional white border.

Figure 2A:
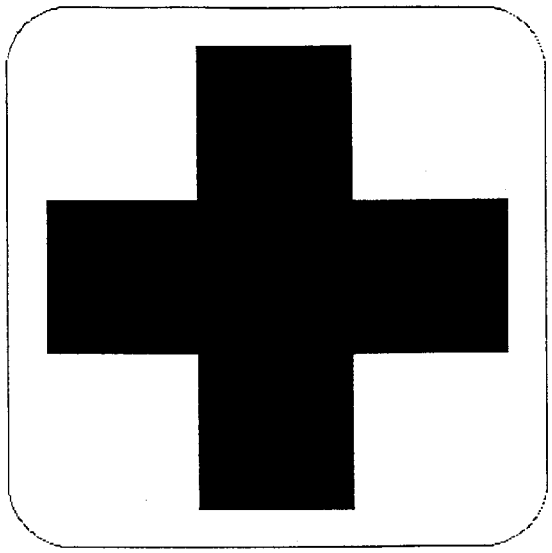
FIG. 2A is a textual/graphical document measuring 8½×11 inches which will be enlarged according to the invention.
Figure 2B:
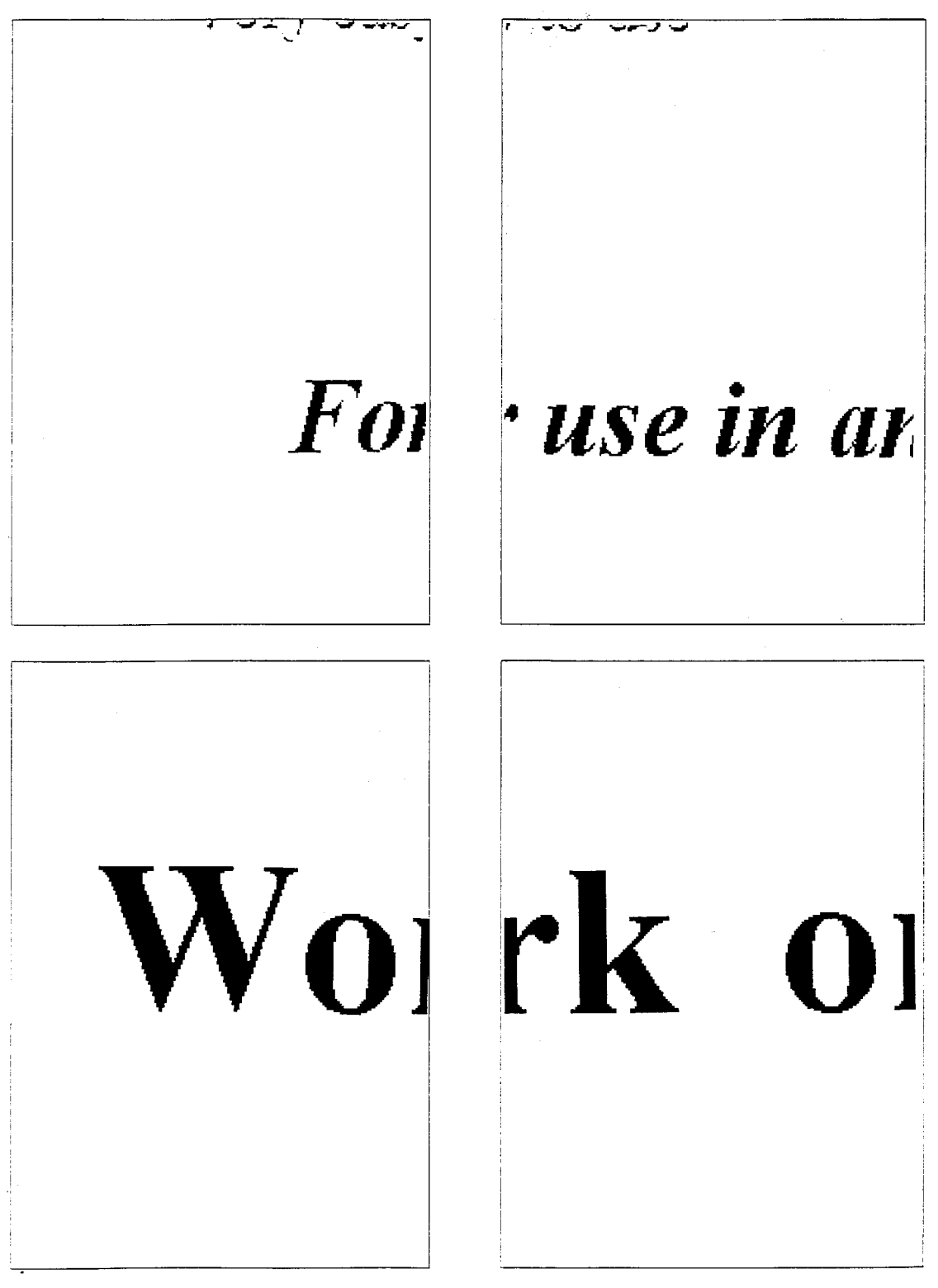

FIG. 2A is a document, measuring 8½×11 and containing textual and graphical information which will be enlarged according to the invention. As can be seen, this image utilizes a variety of type fonts, in both heavy and light consistency, as well as a hard-edge graphic and a free-form word "play." FIG. 2B, which is 16 pages long, represents the subunits comprising the image of FIG. 2A, having been printed in sectioned form according to the invention. Major steps associated with the underlying method aspect of the invention will now be described in further detail with reference to the flowcharts of FIGS. 3A through 3D and FIG. 4.

Figure 3A:
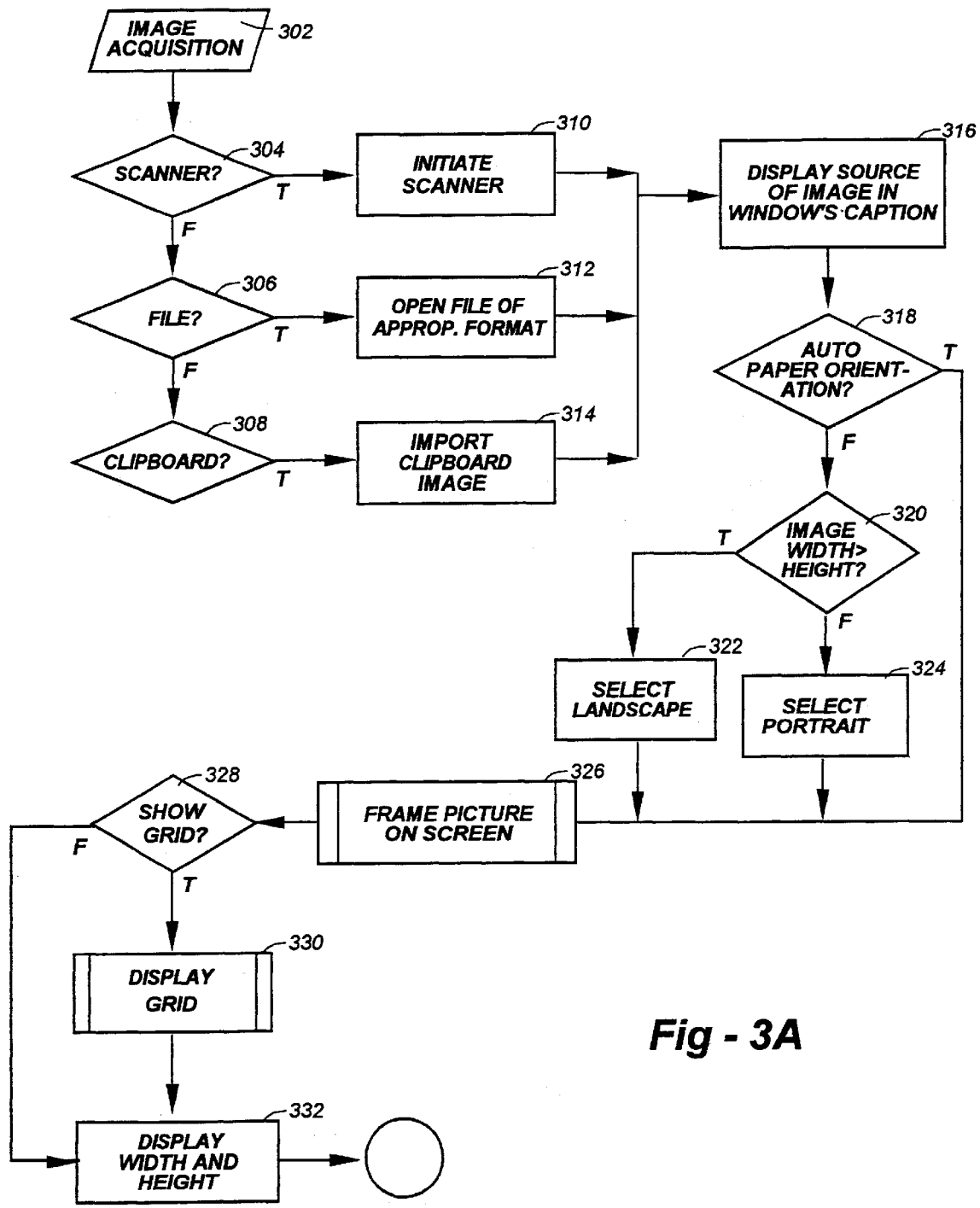
FIGS. 3A through 3D is a flowchart of major software subroutines according to the invention.

In particular, FIG. 3A illustrates those steps associated with the acquisition of an image for the purposes of enlargement. At block 302, an image acquisition sequence is initiated, followed by queries as to whether the source of origin for the input image was gathered via scanner or digital camera (block 304), through a file (block 306), or via a computer clipboard (block 308). In the event that any of these questions are in the affirmative, blocks 310, 312 and 314 are entered, respectively.

At block 316, the image source is displayed in a captioned window, after which, additional queries are processed regarding image orientation. For example, at block 318, the question is asked whether auto paper orientation has been selected, and, if so, at block 320, a further question is asked regarding whether or not the width of the image exceeds the height. If so, at block 322 a landscape orientation is selected, but if not, at block 324, a portrait orientation is selected. Following this, at block 326, the picture is framed on the screen of the display device associated with the computer system, which will be described in further detail with reference to FIG. 3B.

Continuing the reference to FIG. 3A, at block 328, a loop is entered to determine whether a grid has been selected by the user which, if so desired, is displayed in overlaying fashion at block 330, which is explained in further detail with reference to FIG. 3C. If not, only width and height attributes of the image are displayed at block 332.

Figure 3B:
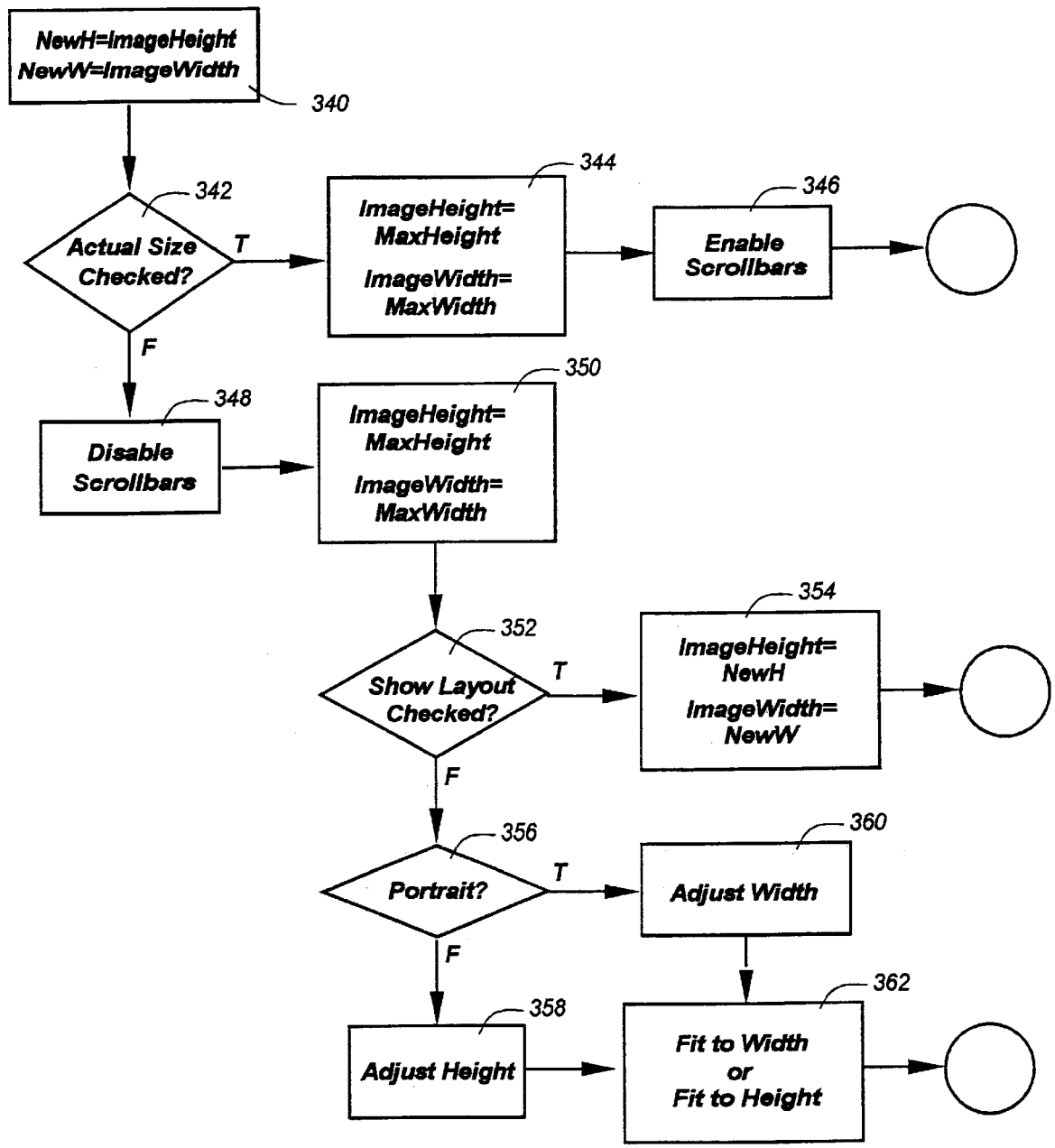

FIG. 3B illustrates the routine entitled "Frame Picture on Screen," as shown at block 326 in FIG. 3A. At block 340, a variable NewH is set to the image height, and a variable NewW is set to image width. At block 342, the question is asked whether actual size has been checked and, if so, image height and image width are set to maximum height and maximum width, respectively, at 344, and scroll bars are enabled at 346. If actual size has not been checked, the scroll bars are disabled at 348, but again, at 350, image height is set to maximum height and image width is set to maximum width, respectively.

At decision block 352, a query is made as to whether layout check should be displayed and, if not, at 354, image height is set to NewH and image width is set to NewW. If check layout is to be displayed, a further question is asked at decision block 356 regarding whether portrait mode has been selected. If not, width is adjusted at 358, but if portrait mode has been selected, height is instead adjusted at 360. Regardless, at block 362, the image is fit to width or fit to height, as appropriate under the circumstances.

Figure 3C:
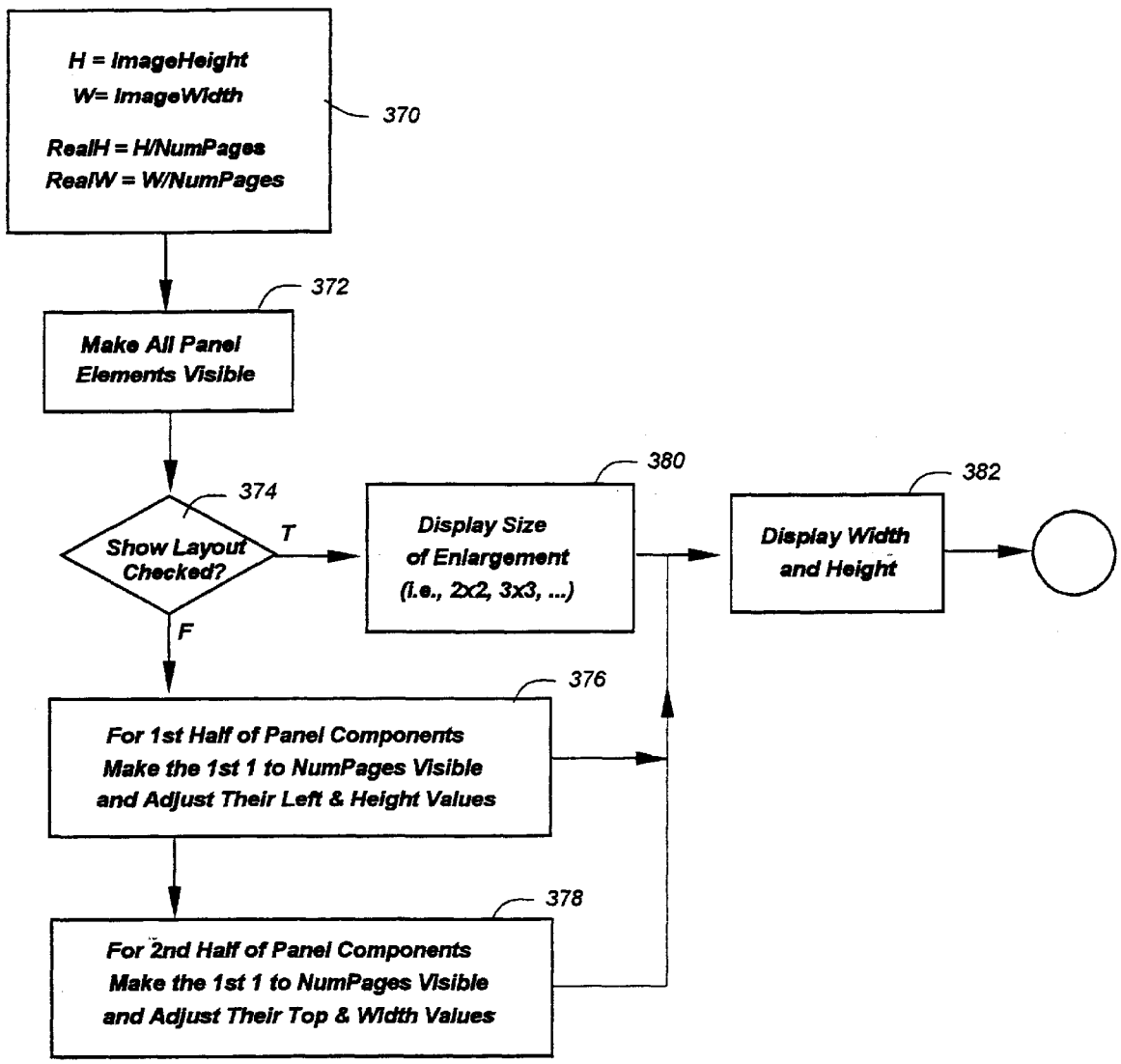

FIG. 3C illustrates the subroutine entitled "Show Grid" as depicted by block 330 in FIG. 3A. Initially, at block 370, the variables H and W are set to image height and image width, respectively, and the variables RealH and RealW are set to H divided by the number of pages and W divided by the number of pages, in accordance with a user control.

At block 372 all panel elements are made invisible, if so selected, and, at decision block 374, the question is asked whether the layout has been checked. If it has, at block 376, for the first half of the panel components the first one to numb pages are made visible and adjusted for left and height value. At block 378, for the second half of the panel components, the first one to numb pages are made visible and their top and width values are adjusted. In the event that the layout has not been checked, or following the steps executed at blocks 376 and 378, the size of the enlargement (i.e., 2×2, 3×3, etc.) is displayed at block 380, and at block 382, width and height of the image are displayed.

Figure 3D:
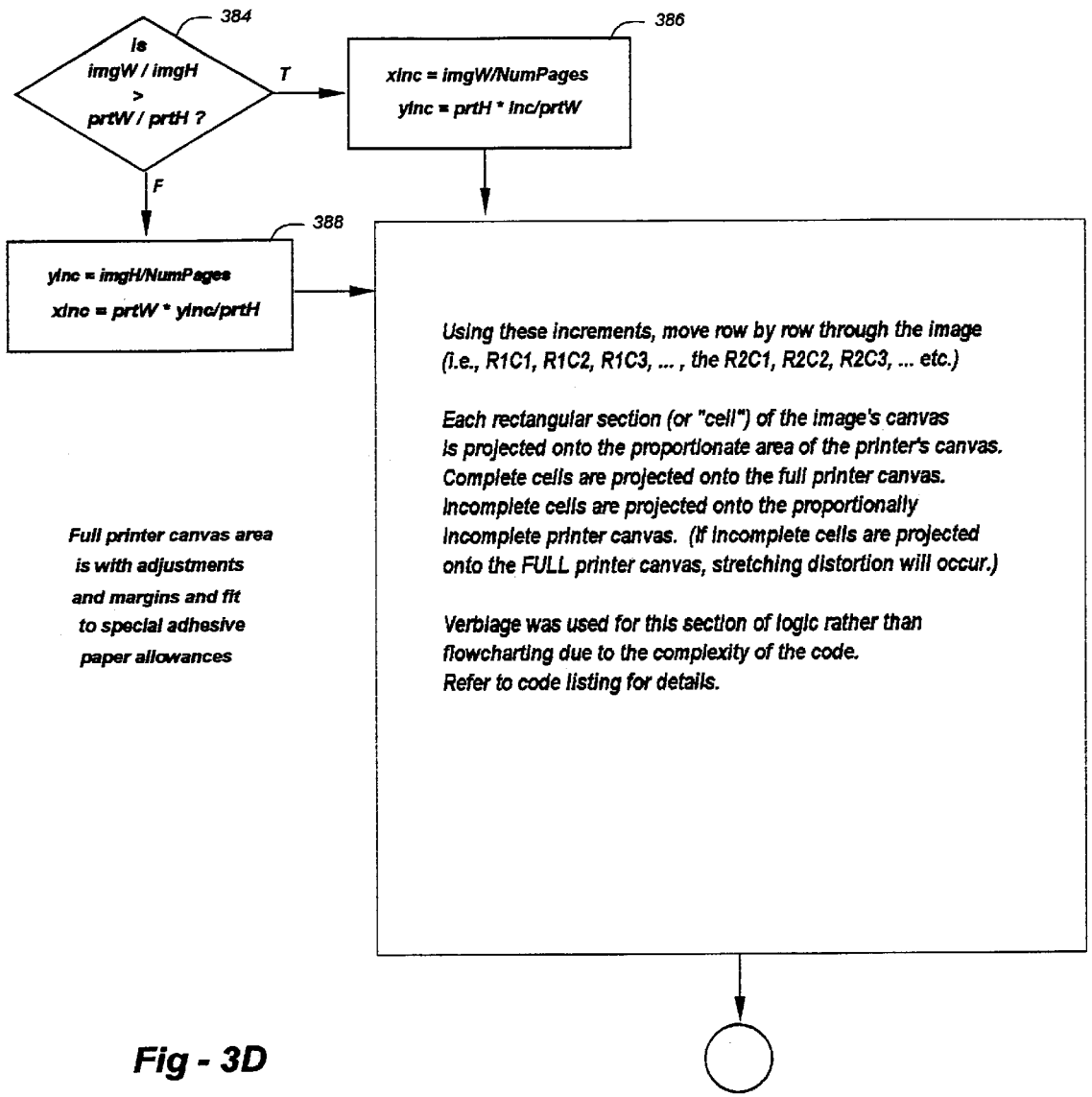

FIG. 3D illustrates major functional operations associated with the printing of an image. At block 384 the question is asked whether image width divided by image height exceeds the printed width divided by the printed height. If so, X is incremented by the image width divided by the number of pages and Y is incremented by the printer height times the X increment. If the result of decision block 384 is negative, at block 388 the Y increment is equal to the image height divided by the number of pages and the X increment is equal to the printed width times the Y increment divided by the printer height. Using these increments, the system moves, row by row, through the image (i.e., R1C1, R1C2, R1C3 . . . to R2C1, etc.), and each rectangular section of cell of the image's canvas is projected onto the proportional area of the printer's canvas. Complete cells are projected onto the full printer canvas, whereas incomplete cells are projected onto the proportionally incomplete printer canvas. Noting that if incomplete cells are projected onto the full printer canvas, distortion may occur through stretching. The full printer canvas area is then width adjusted for margins and fit to special adhesive paper, as appropriate.

Figure 4:
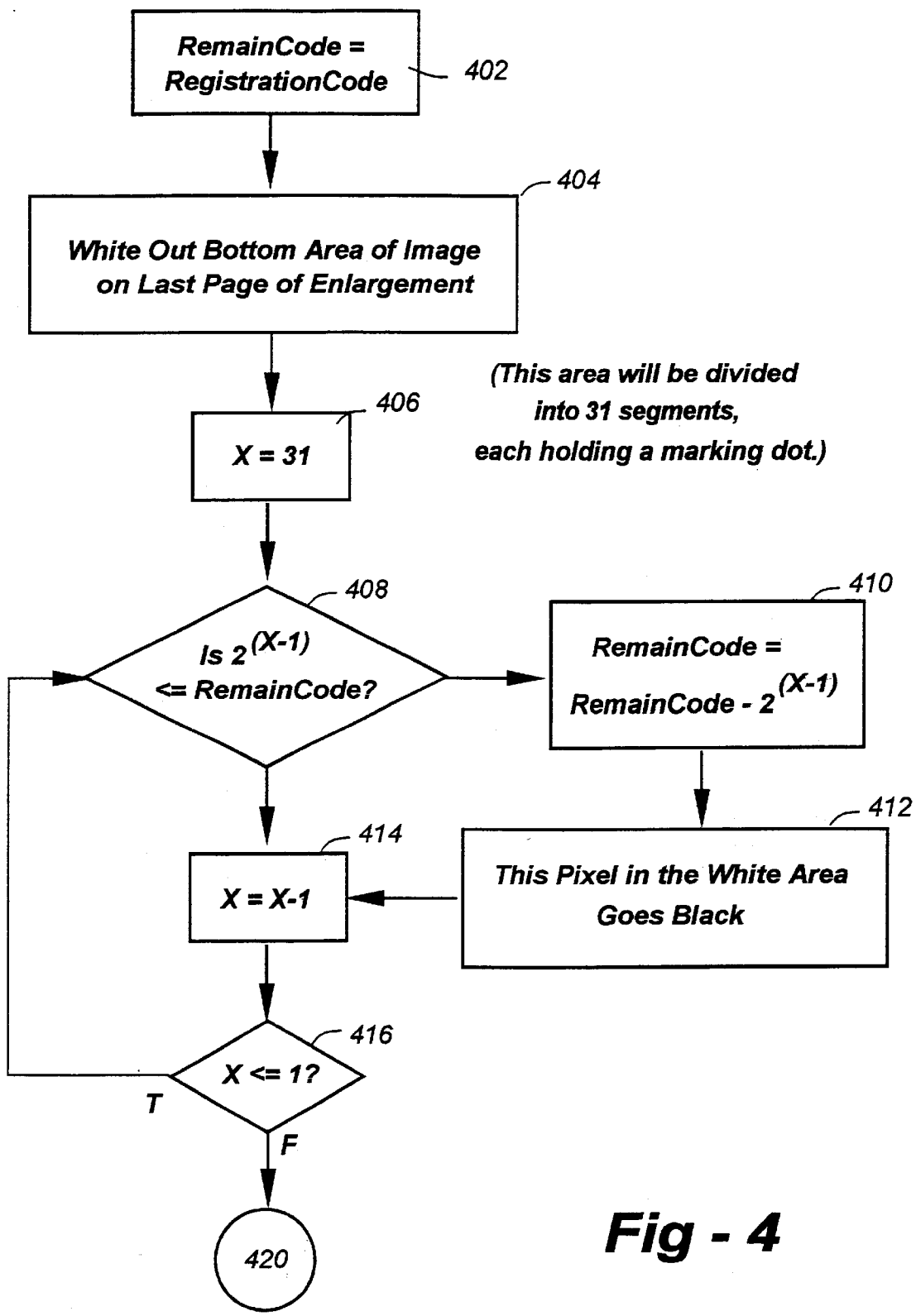
FIG. 4 is a flowchart used to illustrate subroutines associated with the inconspicuous imprinting of an identification code onto one or more of the discrete sections comprising an enlargement according to the invention.

FIG. 4 illustrates major functional operations associated with the printing of a registration code according to the invention. At block 402, a variable remain code is set equal to the registration code. At block 404, the bottom area of the image on the last page of the enlargement is whited out, and this area is divided into 31 segments, each holding a marking dot. At 406, X is set equal to 31, and a loop is entered at decision block 408 asking whether $2^{(x-1)}$ is equal to the remainder code. If true, the remainder code is set equal to the remainder code minus $2^{(x-1)}$ at block 410, and at block 412, this particular picture in the whited area goes black, and, at block 414, X is decremented. At block 416, the question is asked whether X is less than or equal to one, and if not, the loop back to 408 continues until X is no longer less than or equal to one, in which case, at point 420, the routine terminates.

What is claimed is:

1. A method of partitioning an image into a plurality of discrete sections and assembling the sections into an enlarged version of the image, comprising the steps of:
   receiving an electronic representation of the image to be enlarged;
   displaying the electronic representation of the image on a display device;
   receiving commands from a user relating to the way in which the image is to be partitioned, including the number of discrete sections;
   providing a sheet having an outer, peripheral edge and a rectangular score line spaced apart from the defining a border around the sheet;
   printing each section immediately up to the score line;
   detaching the border; and
   assembling the sheets with their borders removed so that are no unprinted gaps between the assembled sheets.

2. The method of claim 1, wherein the step of receiving an electronic representation of the image to be enlarged includes the step of scanning the image.

3. The method of claim 1, wherein the step of receiving an electronic representation of the image to be enlarged includes the step of importing the image from a file in electronic form.

4. The method of claim 1, wherein the step of receiving an electronic representation of the image to be enlarged includes the step of importing the image from a computer clipboard.

5. The method of claim 1, further including the steps of:
   analyzing the format of the electronic representation of the image; and automatically selecting either a portrait or a landscape orientation based upon the format.

6. The method of claim 1, further including the step of:

displaying, along with the electronic representation of the image, a plurality of grid lines representative of the way in which the image is to be partitioned.

7. The method of claim 6, further including the step of:

moving the grid lines in relation to the electronic representation of the image on the display device in response to a user command.

8. The method of claim 6, further including the step of:

moving the electronic representation of the image in relation to the grid lines on the display device in response to a user command.

9. The method of claim 1, further including the step of:

printing, onto each section, one or more registration marks useful in assembling the sections into the enlarged version of the image.

10. The method of claim 1, wherein the step of printing each discrete section includes the step of:

printing each section onto an adhesive-backed sheet, and wherein the step of assembling the printed sections into the enlarged version of the image includes the step of:

mounting the adhesive-backed sheets onto a supporting substrate in matrix fashion.

11. The method of claim 10, further including the steps of:

providing an adhesive-backed sheet having an outer, peripheral edge and a rectangular score line spaced apart from the edge defining a border around the sheet;

printing each section immediately up to the score line;

detaching the border; and mounting the adhesive-backed sheets onto the supporting substrate in matrix fashion so that are no unprinted gaps between the mounted sheets.

12. The method of claim 1, further including the step of:

printing, onto at least one of the discrete sections, inconspicuous visual indicia representative of an identification code.

* * * * *